United States Patent
Aho et al.

(10) Patent No.: US 10,268,384 B2
(45) Date of Patent: Apr. 23, 2019

(54) FILE TRANSFERS BETWEEN MACHINES WITHOUT TARGET CPU INTERVENTION

(71) Applicant: International Business Machines Corporation, Armonk, NY (US)

(72) Inventors: Michael E. Aho, Rochester, MN (US); Thomas M. Gooding, Rochester, MN (US); Bryan S. Rosenburg, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/267,415

(22) Filed: Sep. 16, 2016

(65) Prior Publication Data

US 2018/0081540 A1    Mar. 22, 2018

(51) Int. Cl.
*G06F 3/06* (2006.01)
*G06F 17/30* (2006.01)

(52) U.S. Cl.
CPC .............. *G06F 3/061* (2013.01); *G06F 3/067* (2013.01); *G06F 3/0643* (2013.01); *G06F 17/30091* (2013.01); *G06F 17/30917* (2013.01)

(58) Field of Classification Search
CPC ......... G06F 17/30091; G06F 17/30917; G06F 3/061; G06F 3/0643; G06F 3/067
See application file for complete search history.

(56) References Cited

U.S. PATENT DOCUMENTS

| | | | |
|---|---|---|---|
| 8,589,723 B2 | 11/2013 | Kumar et al. | |
| 8,868,867 B2 | 10/2014 | Swanson et al. | |
| 9,021,189 B2 | 4/2015 | Salessi | |
| 2013/0066930 A1* | 3/2013 | Kamei | G06F 3/061 707/823 |

* cited by examiner

*Primary Examiner* — Yong J Choe

(74) *Attorney, Agent, or Firm* — Patterson + Sheridan, LLP

(57) ABSTRACT

Techniques for transferring files between machines include creating a zero-length target file on non-volatile storage, truncating the file to a desired size, and allocating storage on the non-volatile storage for each block of the target file. The technique also includes determining a logical block address (LBA) for each location in the target file. The technique further includes sending a request to an input/output (I/O) node to transfer a source file to the non-volatile storage, where the request includes a mapping between the LBAs and file offsets. The technique includes opening the source file and a block device at the I/O node. The technique further includes reading each block from the source file and writing each block to the target file on the non-volatile storage utilizing the block device, and then closing the source file and the block device.

20 Claims, 5 Drawing Sheets

FILE TRANSFERS BETWEEN MACHINES WITHOUT TARGET CPU INTERVENTION

GOVERNMENT LICENSE RIGHTS

This invention was made with government support under contract number B604142 awarded by the United States Department of Energy. The government has certain rights in the invention.

BACKGROUND

The present invention relates to computer processing, and more specifically, to transferring data between a compute node and a file system.

Applications running on compute nodes often need to access common files. In high performance computing systems (HPC), the files are traditionally stored on large parallel file systems, such as GPFS (general parallel file system) or Lustre. HPCs place a large demand on file systems to deliver data to the compute nodes upon demand fetch/store. Programs running on these HPCs often generate or use data faster than the data can be written to or read from the file system. One particular concern is checkpoint files. For some systems, a single checkpoint might exceed two petabytes. Assuming peak throughput of the file system, these checkpoint files may take around 20-30 minutes to read the file. It takes another 20-30 minutes to write each new checkpoint to disk. This is data that needs to be transferred before a job on the compute node can start or resume any useful calculation.

Classical file transfer would be performed as a file-level cp (copy), mv (move), rsync, or ftp (file transfer protocol). These solutions use the processors and operating system to read/write the file system data on both sides of the communication. They also use CPU (central processing unit) cycles to transfer the data. This activity robs performance away from applications that are running on the system.

In addition, these types of classical file transfers can cause "jitter" on the compute nodes. Jitter refers to the interference experience by an application due to scheduling of background processes and handling of asynchronous events such as interrupts. Aggregate interrupts across the compute nodes occur at random times with respect to each other, but the compute nodes may be working simultaneously on the same job. The operating system (OS) is interrupted, data is copied into the file system, data is instantiated in the file system, then data is pushed to a solid state disk (SSD) or other non-volatile storage associated with the compute node. With systems that may have 5,000 or more compute nodes, this type of OS noise degrades performance of the system.

An alternative solution might be to extend the parallel file system, using the compute node SSDs as a large cache. This solution adds complexity to the file system since it would now need to know compute node affinity for certain files. This solution would also likely use CPU cycles to manage coherency between the disjoint compute nodes. File systems may also run into scaling issues with 5,000 or more file servers.

SUMMARY

One embodiment of the present invention is a method for transferring a file to a target machine without CPU intervention of the target machine. The method comprises creating a zero-length target file on non-volatile storage, truncating the file to a desired size, and allocating storage on the non-volatile storage for each block of the target file. The method also comprises determining a logical block address (LBA) for each location in the target file. The technique further comprises sending a request to an input/output (I/O) node to transfer a source file to the non-volatile storage, where the request comprises a mapping between the LBAs and file offsets. The technique comprises opening the source file and a block device at the I/O node. The technique also comprises reading each block from the source file and writing each block to the target file on the non-volatile storage utilizing the block device, and then closing the source file and the block device.

Another embodiment of the present invention is a method for transferring a file from a target machine without CPU intervention of the target machine. The method comprises determining, by the compute node, an LBA for each location in a source file stored on the non-volatile storage. The method further comprises sending a request to an I/O node to transfer the source file to the I/O node, wherein the request comprises a mapping between the LBAs and file offsets. The method comprises creating a zero-length target file on the I/O node with a target name and opening the target file at the I/O node. The method further comprises opening a block device at the I/O node corresponding to the compute node. The method also comprises reading each block from the source file and writing each block to the target file on the I/O node utilizing the block device. The method further comprises closing the source file and the block device.

Another embodiment of the present invention is a non-transitory computer-readable storage medium having computer-readable program code embodied therewith, the computer-readable program code configured to perform the operations described above.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
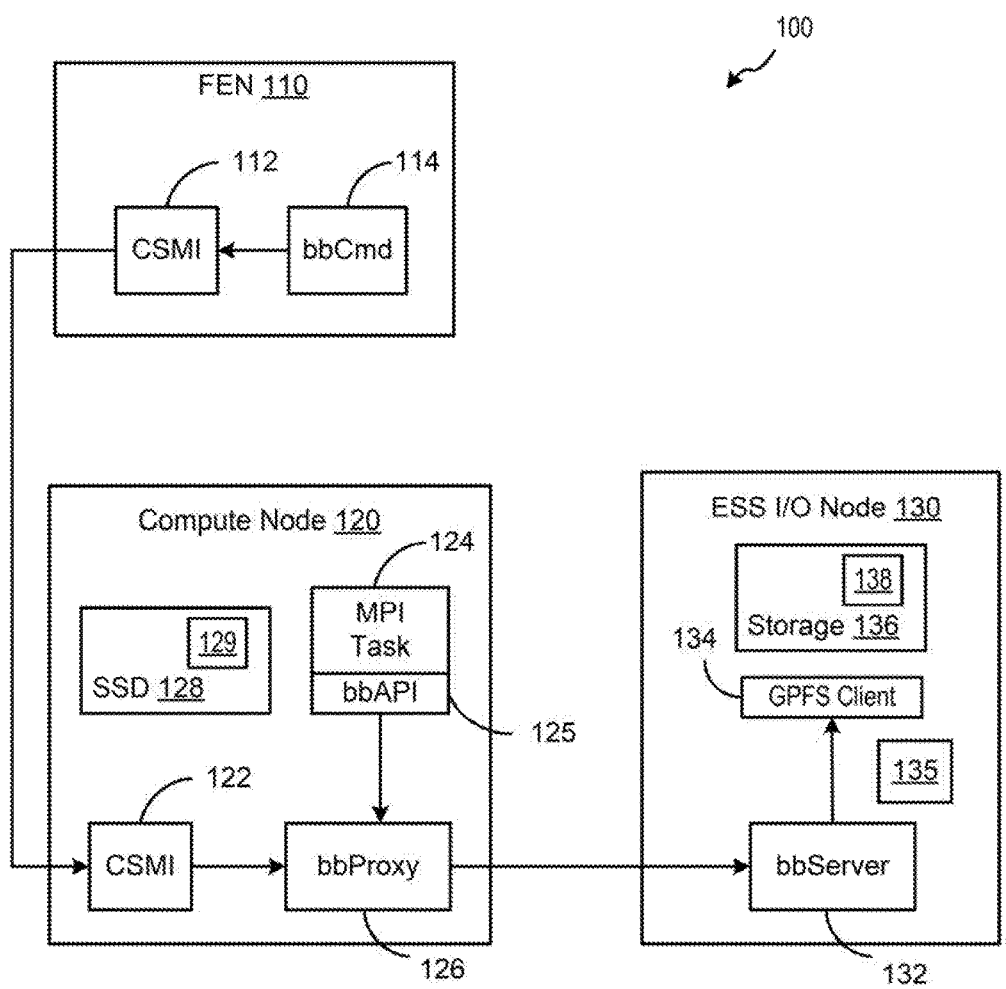
FIG. 1 illustrates a server structure for performing file transfers, according to one embodiment described herein.

Embodiments described herein disclose techniques for transferring files between machines without using the processors and operating system on the compute node. Data needs to be transferred from a file system to compute nodes without disrupting the code or job running on the compute node. The data that is transferred may be data transferred to the compute node for the next job or data transferred to the file system from a previous job. In embodiments described herein, each compute node will have non-volatile storage, such as one SSD, on it. Non-volatile storage other than SSD may be used, such as MRAM (magnetoresistive random access memory) or PCM (phase-change memory). Embodiments described herein use SSD as an example of non-volatile storage, but it is understood that any type of non-volatile storage may be used. A file from a disk in a traditional disk drive cluster is transferred to the SSD so that the file is on the SSD when the job running on the compute node needs it, instead of having to retrieve the file from the disk drive cluster. The non-volatile memory express (NVMe) over Fabrics standard is used to transfer the data across the network and place it on the SSD. This standard allows data to be copied from a file system onto the SSD of a compute node without intervention from the compute node.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

FIG. 1 illustrates a server structure 100 according to one embodiment. Structure 100 is a high level architecture diagram that illustrates various hardware and software components of structure 100. The major components of structure 100 are front end node (FEN) 110, compute node(s) 120, and elastic storage server input/output node(s) 130 (ESS I/O node).

Jobs for the compute node are started at FEN 110. When a user wants to start a task, a software program bbCmd 114 (burst buffer command) denotes which files need to be transferred to which compute nodes for the job to begin. Then, CSMI 112 (control systems management interface) passes that information to the appropriate compute node 120 (specifically, to CSMI 122 on compute node 120 in this example).

Compute node 120 comprises CSMI 122, MPI (message passing interface) Task 124, bbAPI 125 (burst buffer application program interface), bbProxy 126 (burst buffer proxy), and SSD 128 (or other non-volatile storage). bbProxy 126 comprises software that handles management of SSD 128. bbProxy 126 can receive requests from CSMI 122 and/or MPI Task 124/bbAPI 125. bbProxy 126 has access to SSD 128 from compute node 120. bbProxy 126 runs on compute node 120 and can handle a variety of tasks related to files on SSD 128. For example, bbProxy 126 can extract information about files on SSD 128. bbProxy 126 can query the file extents for files on SSD 128. bbProxy 126 can allocate space for files on SSD 128. While one compute node 120 is shown, it is understood that any number of compute nodes 120 may be utilized in the system (often, 5000 or more compute nodes). In addition, SSD 128 can comprise any suitable structure of solid state disks, including more than one solid state disk. An example file 129 is illustrated on SSD 128.

ESS I/O node 130 comprises a storage server (a processor with spinning disk drives attached, in this example). bbServer 132 (burst buffer server) comprises software that runs on ESS I/O node 130. In this embodiment, ESS I/O node 130 runs NVMe over Fabrics to access the SSDs 128 on the compute nodes. ESS I/O node 130 also comprises a GPFS client 134 that manages the parallel file system on ESS I/O node 130. Storage on ESS I/O node 130 is denoted as storage 136, and an example file 138 is also illustrated.

ESS I/O node 130 further comprises one or more NVMe over Fabrics block devices 135 that correspond to each compute node 120. Block devices 135 are kernel modules that each correspond to a compute node 120. The block device 135 performs operations on its associated compute node 120, including communicating across a network connection and opening up an SSD 128 associated with the compute node 120 to access the SSD 128.

For SSD drives or other non-volatile storage, the NVMe over Fabrics standard allows for data transfers from an initiator machine into the SSD of a target machine, without the target machine's CPU involvement. NVMe over Fabrics works if the initiator machine "owns" the file system mountpoint, or if the initiator machine performs raw SSD accesses. However, embodiments described herein provide the capability of transferring data to the SSD when the target CPU owns the file system mountpoint. Embodiments described herein also allow multiple initiators to concurrently directly write into the target SSD.

Compute nodes 120 format SSDs 128 with any suitable file system, such as an ext4 or similar file system. However, the initiator machine has no knowledge of the inner workings of the ext4 file system. To overcome this limitation, the ext4 file system is queried on the target machine to obtain file extent mappings, and that translation information is passed to the initiator machine. Once the initiator machine has the translation, the initiator machine can directly write into the target machine's SSD and into the correct location on the SSD. After the transfer, the target machine can read the data on the SSD via normal file system operations.

bbProxy 128 and bbServer 132 work in conjunction to manage operations for transferring files to target machines. At a high level, the embodiments described herein utilize a few key ideas. First, the compute node 120 translates file offsets into logical block addresses (LBAs) on the SSD 128. Second, the ESS I/O node 130 opens the file 138 stored on the ESS I/O node 130 and reads data. Third, the data is pushed to the correct location on SSD 128, using the LBA location determined by compute node 120. Fourth, the file system of SSD 128 is updated to indicate that the file data is available.

A number of flowcharts follow that illustrate the operations of the embodiments described herein. First, the process for transferring a file from the parallel file system to the SSD 128 is described in FIGS. 2-3. Then, a process for transferring a file from the SSD 128 to the parallel file system is described in FIGS. 4-5.

Figure 2:
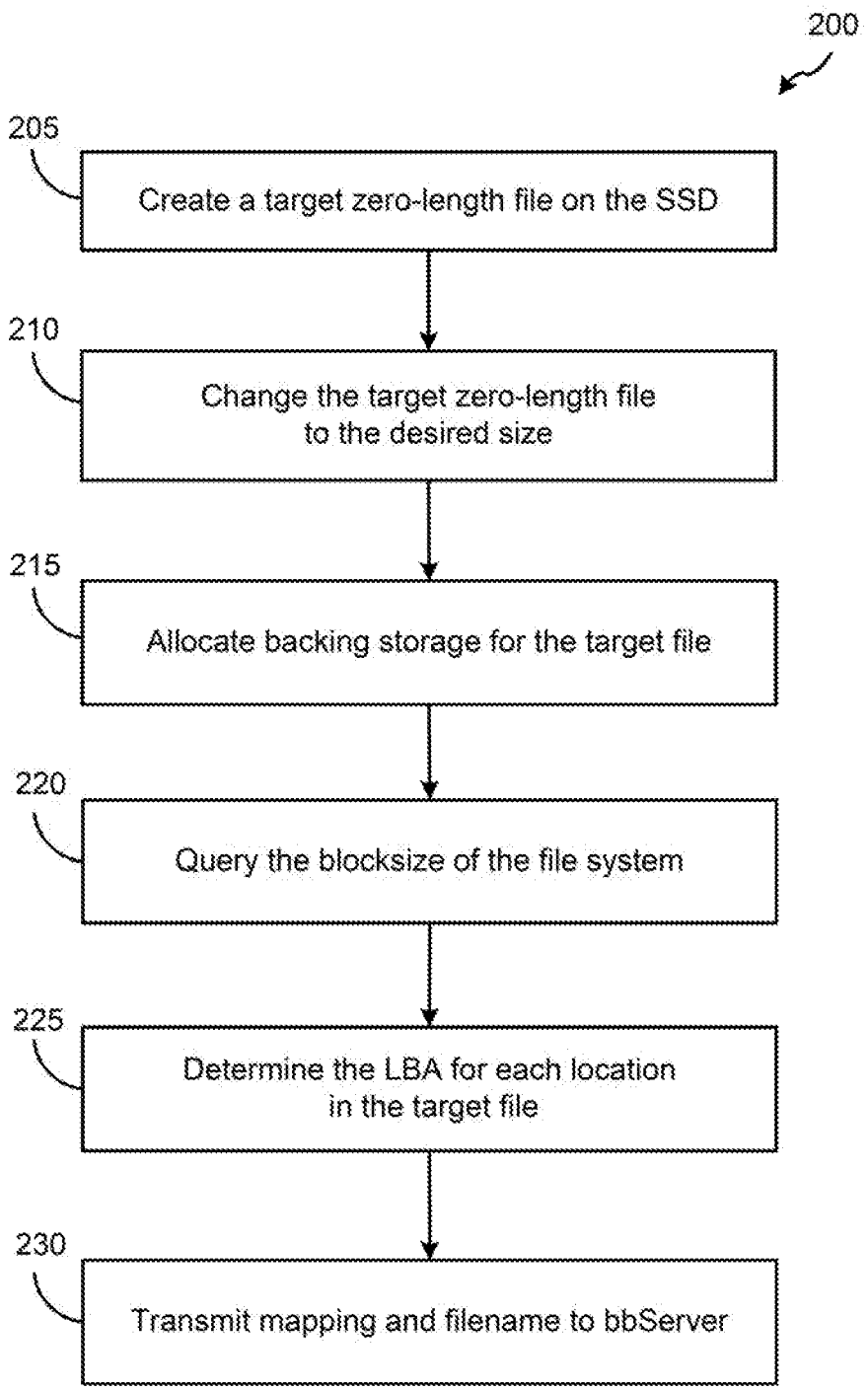
FIG. 2 is a flow chart for transferring files between machines, according to one embodiment.

FIG. 2 is a flowchart illustrating an example method 200 for transferring data to a compute node, according to one embodiment. Although the method steps are described in conjunction with the systems of FIG. 1, persons skilled in the art will understand that any system configured to perform the method steps, in any order, falls within the scope of the present invention. In various embodiments, the hardware and/or software elements described above in FIG. 1 can be configured to perform the method steps of FIG. 2.

The method begins at step 205, where, after bbProxy 126 receives a request to transfer a file from the parallel file system to the compute node, bbProxy 126 creates a new zero-length file on SSD 128 with a desired target name and access permissions. The access permissions may include permissions such as read/write permission for various users. The process then proceeds to step 210.

At step 210, the zero-length file is truncated or changed so that the target file matches the desired size (i.e., the size of the actual source file on the parallel file system). bbProxy 126 can use a function like ftruncate to perform this operation. In this operation, the storage on the SSD 128 is not actually zeroed out. If a location within the file on the SSD is queried after ftruncate is performed, no data is returned because the storage has not been allocated yet. Instead, metadata is read and a zero is returned without actually reading the location.

The method proceeds to step 215, the file is allocated so that the target file has backing storage allocated for each block on the SSD. bbProxy 126 can use a function like fallocate to perform this operation. The storage is allocated in step 215, but the storage does not have to be initialized. The storage could be initialized, but initialization would cause additional wear on SSD 128 and degrade the operational lifespan of the SSD. After allocation is performed, the location of the data blocks can be queried.

The method proceeds to step 220, where bbProxy 126 queries the blocksize of the file system. For example, a FIGETBSZ command may be used to query the blocksize. In some embodiments, step 220 is an optional step. Many blocks are 64 k in size and that value can be used instead of querying the block size.

The method proceeds to step 225, where bbProxy 126 determines the LBA for each location in the file. bbProxy can use FIEMAP for this step. FIEMAP returns the file extents for each location in the file. The file extent comprises a starting address and a length.

For each block within the file, FIEMAP returns the location with respect to how the file system is mounted. The file system can be built on a partition, and a file system can be placed on each partition. When data is pushed to the SSD using NVMe over Fabrics, the data is written directly to the SSD. Therefore, knowledge of how the disk drive is partitioned is needed to appropriate offsets from the start of the file system to the start of the partition. This often involves a simple add operation. The offset of the partition from the beginning of the file system is determined, and that number of bytes is added as the offset. In Linux, a logical volume manager (LVM) may be used. LVM is a device mapper target that provides logical volume management for the Linux kernel. In embodiments utilizing LVM, a location retrieved from the file system is used in a query to LVM to find the location that LVM placed the data. Therefore a hierarchy of queries is performed to find a location (the LVM, then the partition, then the disk drive).

Once the physical location of the file on the SSD 128 is determined, that information can be transmitted to bbServer 132 in step 230. Particularly, the mapping between file offsets and LBAs can be transmitted. The filename, userid, groupid, extent information, and other information can also be transmitted. This transmission comprises the request to the bbServer 132. Then, bbProxy 126 waits for a reply. The operations performed by bbServer 132 and other components are described in further detail in FIG. 3 below.

Figure 3:
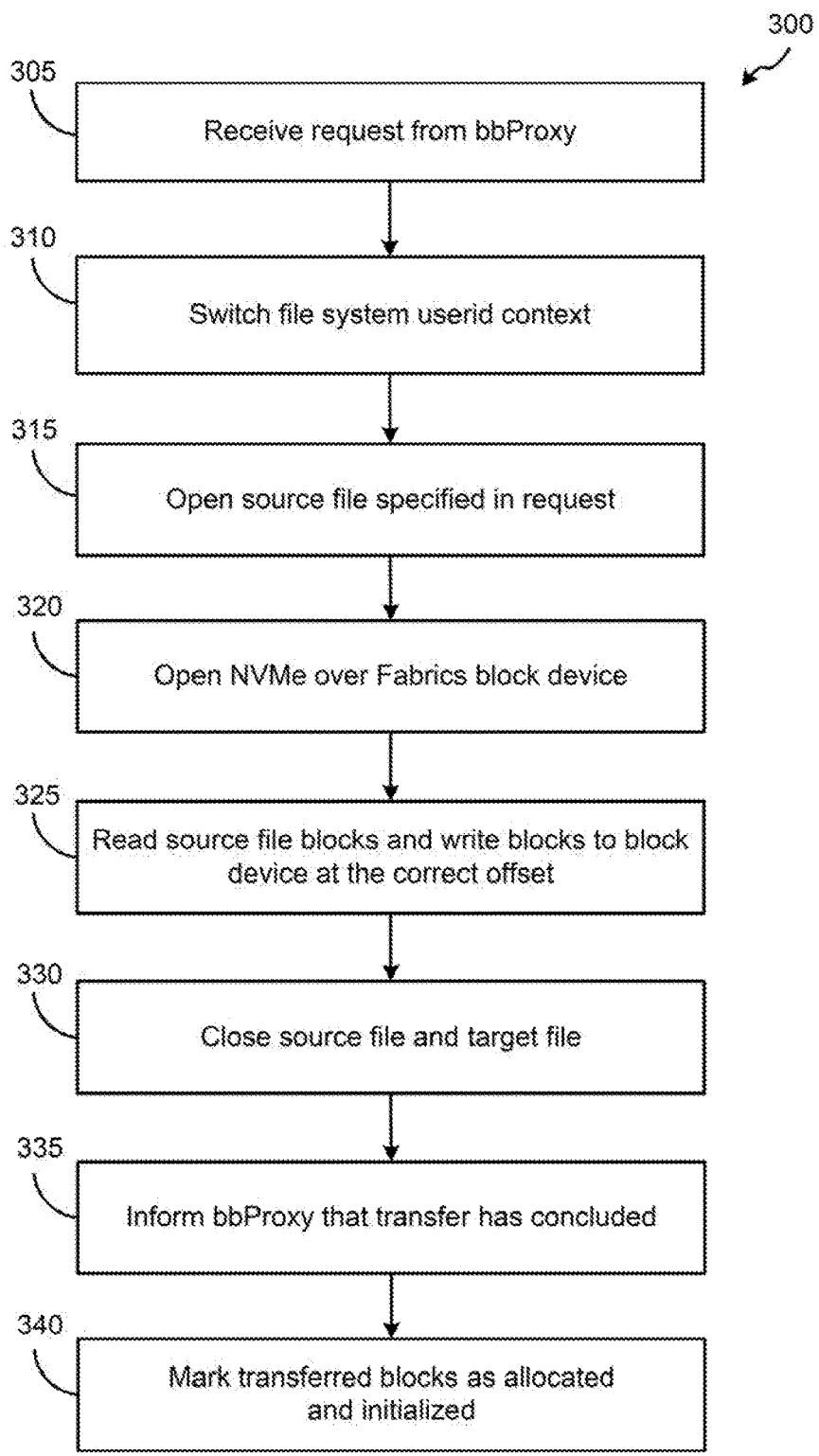
FIG. 3 is a flow chart for transferring files between machines, according to another embodiment.

FIG. 3 is a flowchart illustrating an example method 300 for transferring data to a compute node, according to one embodiment. Although the method steps are described in conjunction with the systems of FIG. 1, persons skilled in the art will understand that any system configured to perform the method steps, in any order, falls within the scope of the present invention. In various embodiments, the hardware and/or software elements described above in FIG. 1 can be configured to perform the method steps of FIG. 3.

The method begins at step 305, where bbServer 132 receives the request transmitted from bbProxy 126. At step 310, bbServer 132 switches the file system userid context if necessary. That is, bbServer 132 switches the context to the appropriate user so that the file can be opened by the user that requested it with appropriate file permissions.

The method proceeds to step 315, where bbServer 132 opens the source file specified in the request. This source file is represented as file 138 in FIG. 1. The method then proceeds to step 320.

At step 320, bbServer 132 opens an NVMe over Fabrics block device 135 that corresponds to the appropriate compute node 120. Opening the device allows for data to be placed in the appropriate location in the target file on SSD 128.

The method proceeds to step 325, where, for each block, the bytes of the source file 138 on ESS I/O node 130 are read, and then that block is written to the NVMe over Fabrics' block device 135 at the correct offset. Block device 135 places the data in the appropriate block of the target file on SSD 128. Once all the blocks have been transferred, the method proceeds to step 330.

At step 330, bbServer 132 closes the source file 138 on ESS I/O node 130 and closes the target file on the SSD 128 via block device 135. As an optional step, the file system userid context can also be restored at this time.

At step 335, a reply is sent to bbProxy 126 to inform bbProxy 126 that the transfer has concluded. At step 340, bbProxy 126 marks blocks transferred to SSD 128 as both allocated and initialized. Step 340 is optional, as it may depend on the file system whether step 340 needs to be performed or not. In addition, any file system counters that indicate that the SSD was written to can be updated in another optional step.

As illustrated in FIGS. 2 and 3, a file stored on a parallel file system like ESS I/O node 130 can be transferred to SSD 128 on compute node 120 without intervention by the CPU of compute node 120. This allows the CPU to continue processing the current job without interrupting the job merely to move data around.

Figure 4:
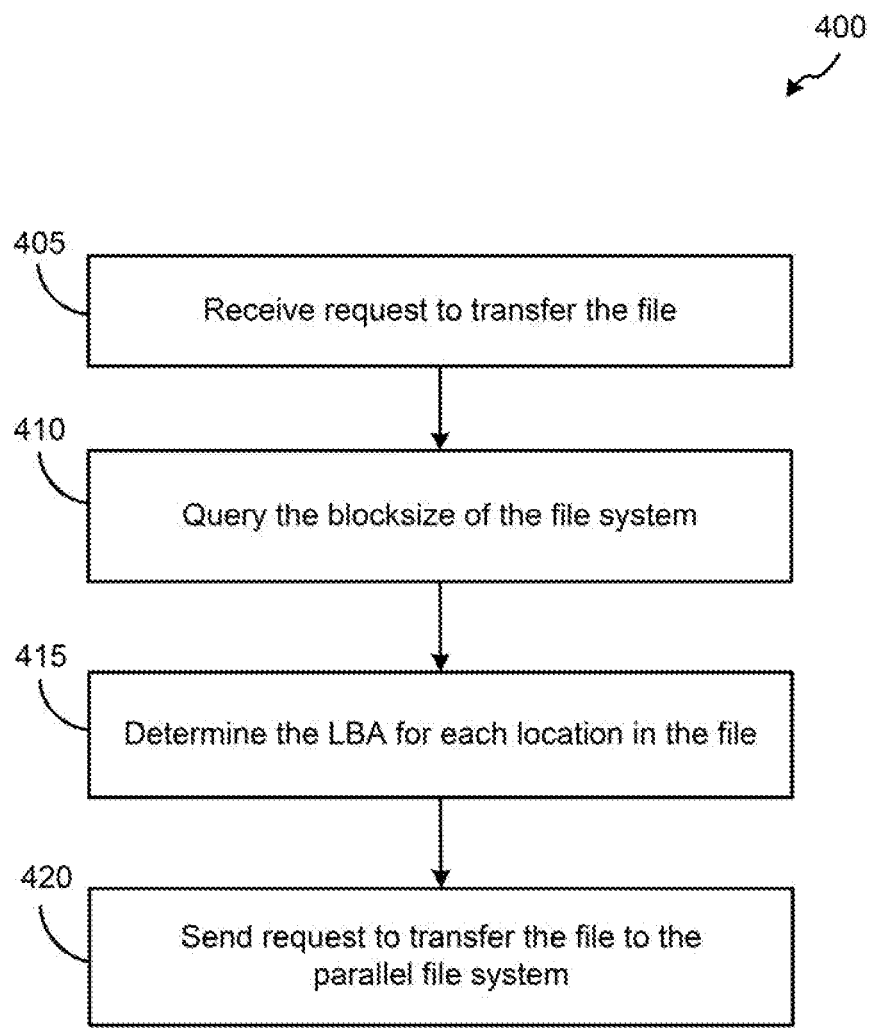
FIG. 4 is a flow chart for transferring files between machines, according to another embodiment.

FIG. 4 is a flowchart illustrating an example method 400 for transferring data from a compute node to a parallel file system, according to one embodiment. Although the method steps are described in conjunction with the systems of FIG. 1, persons skilled in the art will understand that any system configured to perform the method steps, in any order, falls within the scope of the present invention. In various embodiments, the hardware and/or software elements described above in FIG. 1 can be configured to perform the method steps of FIG. 4.

In this embodiment, the file exists on the SSD 128 (such as file 129) and a user or application needs to transfer the file to the parallel file system. For example, the file may comprise result data from a job that has completed, and now the data needs to be moved to the file storage so that SSD 128 can be used for another job. Because the file is already on SSD 128, no ftruncate or fallocate operations need to be performed in this example. The method begins at step 405, where bbProxy 126 receives the request to transfer the file.

The method proceeds to step 410, where bbProxy 125 queries the blocksize of the file system. For example, a FIGETBSZ command may be used to query the blocksize. In some embodiments, step 410 is an optional step. Many blocks are 64 k in size and that value can be used instead of querying the block size.

The method proceeds to step 415, where bbProxy 126 determines the LBA for each location in the file. bbProxy can use FIEMAP for this step. FIEMAP returns the file extents for each location in the file. As described above, for each block within the file, FIEMAP returns the location with respect to how the file system is mounted.

Figure 5:
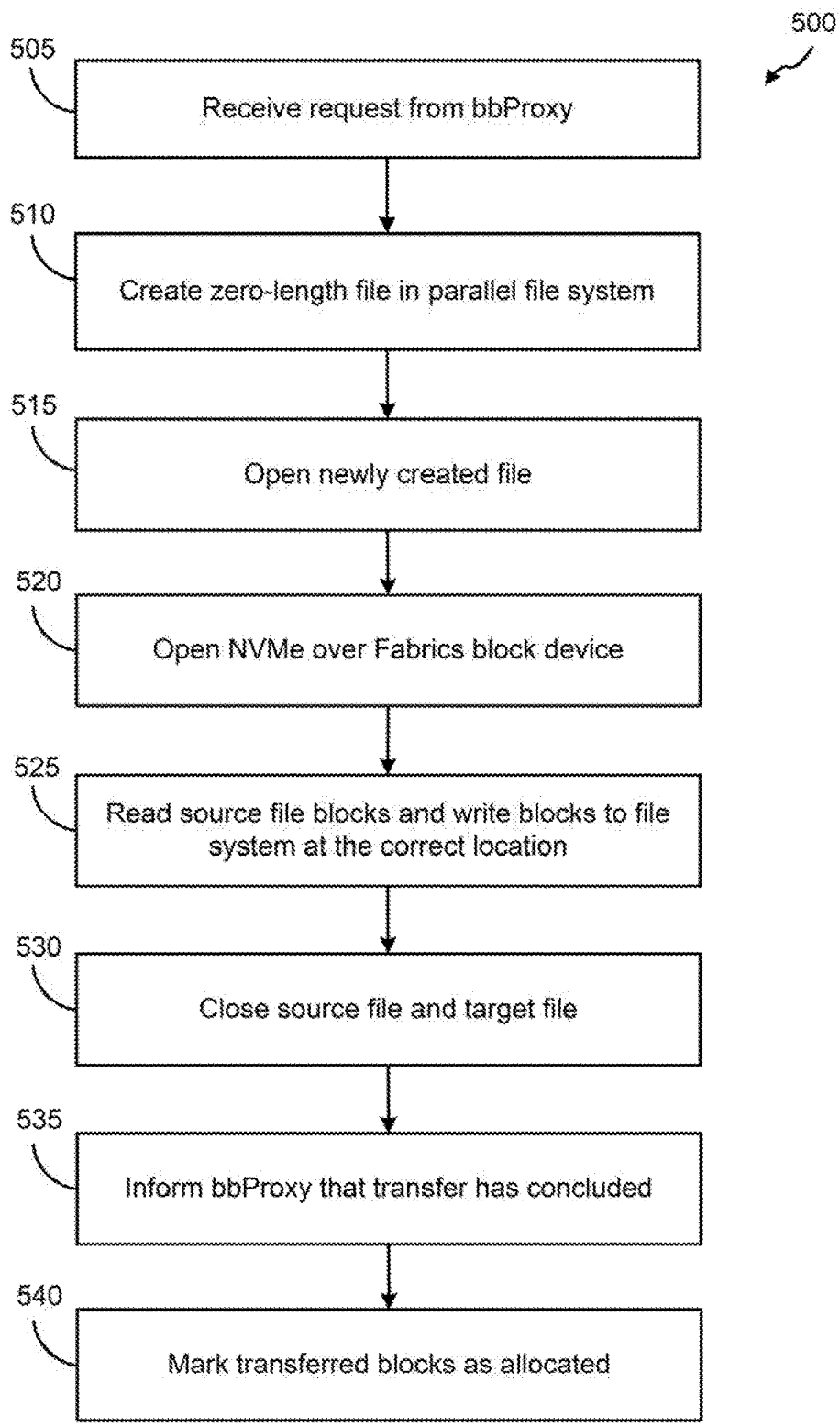
FIG. 5 is a flow chart for transferring files between machines, according to another embodiment.

The method proceeds to step 420, where bbProxy 126 sends a request to bbServer 132 to transfer the file to the parallel file system. This request to bbServer 132 can include not only the mapping between file offsets and LBAs, but also the filename, userid, groupid, etc. Then, bbProxy 126 waits for a reply. FIG. 5 describes the method steps that occur after this request is sent to bbServer 132.

FIG. 5 is a flowchart illustrating an example method 500 for transferring data from a compute node to a parallel file system, according to one embodiment. Although the method steps are described in conjunction with the systems of FIG. 1, persons skilled in the art will understand that any system configured to perform the method steps, in any order, falls within the scope of the present invention. In various embodiments, the hardware and/or software elements described above in FIG. 1 can be configured to perform the method steps of FIG. 5.

The method begins at step 505, where bbServer 132 receives the request from bbProxy 126 to transfer the file. If necessary, bbServer 132 can switch the file system userid context to the appropriate user after receiving the request.

The method proceeds to step 510, where bbServer 132 creates a new zero-length file in storage on ESS I/O node 130 (the parallel file system). The new zero-length file has a target name and appropriate access permissions. As optional steps, bbServer 132 can use ftruncate so that the file on the parallel file system matches the desired size, and then use fallocte so that the file has the required backing storage. However, bbServer 132 can allocate space for the file on the parallel file system as the file is being written, so these steps are not necessary. However, these steps may increase efficiency in some embodiments.

The method proceeds to step 515, where bbServer 132 opens the file created in step 510. The method then proceeds to step 520, where bbServer 132 opens an NVMe over Fabrics block device 135 that corresponds to the appropriate compute node 120. Opening the device allows for data to be read from the appropriate location in the source file 129 on SSD 128.

The method proceeds to step 525, where, for each block in source file 129, the bytes of the source file 129 on SSD 128 are read by block device 135, and then that block is transmitted using NVMe over Fabrics to bbServer 132 so that the block can be written to the correct location in the target file on the parallel file system. Once all the blocks have been transferred, the method proceeds to step 530.

At step 530, bbServer 132 closes the target file on ESS I/O node 130 and closes the source file 129 on the SSD 128 via block device 135. As an optional step, the file system userid context can also be restored at this time.

At step 535, a reply is sent to bbProxy 126 to inform bbProxy 126 that the transfer has concluded. After bbProxy 126 receives the reply, the method proceeds to an optional step 540.

At step 540, bbServer 132 marks blocks transferred to the parallel file system as allocated. Step 540 is optional, as it may depend on the file system whether step 540 needs to be performed or not. In addition, any file system counters that indicate that the SSD was read from can be updated in another optional step by bbProxy 126.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for transferring data from a file system to non-volatile storage on a compute node, comprising:
    in response to a request to transfer a source file from the file system to the compute node, creating a target file on the non-volatile storage, wherein the target file is a zero-length file with a target name;
    changing the target file to match a desired file size;
    allocating storage on the non-volatile storage for each block of the target file;
    determining, by the compute node, a logical block address (LBA) for each location in the target file;
    sending a request to an input/output (I/O) node of the file system to transfer the source file to the non-volatile storage on the compute node, wherein the request comprises a mapping between the LBAs and file offsets;
    opening the source file at the I/O node;
    opening a block device at the I/O node corresponding to the compute node;
    reading each block from the source file and writing, utilizing the block device while bypassing a central processing unit of the compute node, each block to the target file on the non-volatile storage using the mapping between the LBAs and file offsets; and
    closing the source file and the block device.

2. The method of claim 1, further comprising, after closing the source file and the block device, replying to the compute node with a result status.

3. The method of claim 2, further comprising marking each block written to the target file as allocated and initialized.

4. The method of claim 1, wherein the blocks are transferred to the target file on the non-volatile storage utilizing non-volatile memory express (NVMe) over Fabrics.

5. The method of claim 1, wherein, after allocating storage on the non-volatile storage for each block of the target file, querying a blocksize of the non-volatile storage file system.

6. The method of claim 1, wherein the desired file size equals a size of the source file.

7. The method of claim 1, further comprising, after closing the source file and the block device, updating a file system counter that indicates data was written to the non-volatile storage.

8. A method for transferring data from non-volatile storage on a compute node to a file system, comprising:
    in response to a request to transfer a source file from the compute node to the file system, determining, by the compute node, a logical block address (LBA) for each location in the source file stored on the non-volatile storage;

sending a request to an input/output (I/O) node to transfer the source file on the non-volatile storage to the I/O node on the file system, wherein the request comprises a mapping between the LBAs and file offsets;

creating a target file on the I/O node, wherein the target file is a zero-length file with a target name;

opening the target file at the I/O node;

opening a block device at the I/O node corresponding to the compute node;

reading each block from the source file and writing, utilizing the block device while bypassing a central processing unit of the compute node, each block to the target file on the I/O node; and closing the source file and the block device.

9. The method of claim 8, further comprising, after closing the source file and the block device, replying to the compute node with a result status.

10. The method of claim 8, further comprising marking each block written to the target file as allocated.

11. The method of claim 8, wherein the blocks are transferred to the target file on the I/O node utilizing non-volatile memory express (NVMe) over Fabrics.

12. The method of claim 8, wherein, before determining the logical block address (LBA) for each location in the source file, querying a blocksize of the non-volatile storage file system.

13. The method of claim 8, wherein, after sending the request to the I/O node, switching a user identification (user ID) context associated with the compute node.

14. The method of claim 8, further comprising, after closing the source file and the block device, updating a file system counter that indicates data was read from the non-volatile storage.

15. A computer program product for transferring data from a file system to non-volatile storage on a compute node, the computer program product comprising a non-transitory computer-readable storage medium having computer-readable program code embodied therewith, the computer-readable program code executable by a processor to cause the processor to:

in response to a request to transfer a source file from the file system to the compute node, create a zero-length target file on the non-volatile storage, wherein the target file is a zero-length file with a target name;

change the target file to match a size of the source file on the file system;

allocate storage on the non-volatile storage for each block of the target file;

determine a logical block address (LBA) for each location in the target file;

send a request to an input/output (I/O) node of the file system to transfer the source file to the non-volatile storage on the compute node, wherein the request comprises a mapping between the LBAs and file offsets;

open the source file at the I/O node;

open a block device at the I/O node corresponding to the compute node;

read each block from the source file and write, utilizing the block device while bypassing a central processing unit of the compute node, each block to the target file on the non-volatile storage using the mapping between the LBAs and file offsets; and close the source file and the block device.

16. The computer program product of claim 15, wherein after closing the source file and the block device, the computer-readable program code is further operable to:

reply to the compute node with a result status.

17. The computer program product of claim 16, wherein the computer-readable program code is further operable to:

mark each block written to the target file as allocated and initialized.

18. The computer program product of claim 15, wherein the blocks are transferred to the target file on the non-volatile storage utilizing non-volatile memory express (NVMe) over Fabrics.

19. The computer program product of claim 15, wherein the desired file size equals a size of the source file.

20. The computer program product of claim 15, wherein after closing the source file and the block device, the computer-readable program code is further operable to:

update a file system counter that indicates data was written to the non-volatile storage.

* * * * *